June 23, 1970     P. C. STEIN     3,516,678
LIMITED LEAKAGE SEAL
Filed June 1, 1964

INVENTOR
PHILIP C. STEIN
BY
ATTORNEYS

United States Patent Office 3,516,678
Patented June 23, 1970

3,516,678
LIMITED LEAKAGE SEAL
Philip C. Stein, Lansdowne, Pa. (% Stein Seal Co., 20th and Indiana Ave., Philadelphia, Pa. 19132)
Filed June 1, 1964, Ser. No. 371,452
Int. Cl. F16j 15/34
U.S. Cl. 277—27                  3 Claims The present invention is directed to sealing devices for the sealing of fluids, and more particularly to a seal for retaining fluid in a pressure chamber where controlled, limited leakage therefrom is permitted.

In the art of providing control leakage seals for movable members such as for rotating shafts, it has been determined that face type seals cooperate with the rotating shaft to provide a fluid film producing region therebetween. A controlled amount of leakage is permitted through the film producing region and the fluid forces in the pressurized chamber act to maintain the thickness of the fluid film producing region at a predetermined value, dependent in magnitude solely upon the pressure difference across the film producing region. Such seal devices, by virtue of the particular shape of the members and by virtue of the pressure distribution in the film producing regions provide a restoring force in the event the thickness of the fluid film is varied. In other words, the variation of the fluid film thickness disturbs an equilibrium pressure distribution in the film producing region and the fluid forces in the system act to restore the equilibrium pressure distribution. Such control leakage sealing devices may include a surface formed on a rotating member disposed complementarily to a surface formed on a floating member, so that the complementary surfaces generate a fluid film therebetween. Since the surfaces are maintained in spaced relationship by the fluid film, substantially no wearing of the sealing members occurs, resulting in a construction having a long life and ease of maintenance.

In such seal arrangements, there must be provided a means for creating the desired equilibrium pressure distribution in the film producing region. In accordance with the prior art, such means may comprise a fluid orifice formed in a seal ring for admitting fluid to a region intermediate the extremities of the film producing region. More specifically in the event there is provided a fluid film producing region of annular configuration, the prior art fluid flow path means formed in the seal ring comprises a plurality of orifices which admit fluid under pressure to positions forming a circle concentric with the outer and inner extremities of the seal ring and disposed intermediate such extremities. In accordance with the prior art, such fluid flow path means have comprised the provision of a plurality of symmetrically spaced orifices extending through the ring to the aforedescribed circular position with the confronting surface of the ring being provided with shallow recesses communicating with the orifice openings and forming segments of the concentric circle.

The use of such orifice means of the prior art have at times resulted in the construction of flow paths having minute openings therein which are subject to clogging by extraneous matter in the fluid system, rendering the arrangement inoperative. The prior art devices have provided screening means for the orifices to prevent their being clogged, however, such screens themselves after continued operation become clogged by extraneous particles again resulting in an inoperative seal. Furthermore, the provision of such flow path means through the seal ring together with such minute orifices therein increases the cost of manufacture of the seal ring.

Accordingly, it is an important object of this invention to provide a new and improved controlled leakage face-type seal.

Another object of this invention is to provide an improved controlled leakage face-type seal having a novel means for regulating the fluid pressure at positions intermediate the extremities of the fluid film producing region thereof.

Briefly, the present invention accomplishes the above cited objects by providing a face-type controlled leakage seal which forms a film producing region between the parts thereof providing a fluid flow path which causes a lesser pressure gradient in the film producing region between the high pressure extremity and a position intermediate the extremities of the film producing region than the pressure gradient which is caused in the remainder of the film producing region. The fluid flow path means is provided in accordance with this invention by providing one of the faces of the seal member forming the film producing region with an offset portion thereon, for example, by forming or machining such a surface in a stepped manner.

Inasmuch as the increased flow or offset portion of the film producing region must be displaced from between 0.0001 to 0.001 inch for certain applications of this invention, difficulty may exist in the actual machining operations. In accordance with another embodiment of this invention the seal ring is provided with an insert secured thereto and adjacent to the low pressure extremity thereof. The insert desirably is of such a thickness that it projects into the film producing region by an amount equal to the desired offset.

Further objects and advantages of this invention will become apparent as the following description proceeds and features of novelty which characterize the invention will be pointed out in particularity in the claims annexed to and forming a part of this specification.

For a better understanding of this invention, reference may be had to the accompanying drawings in which.

Figure 1:
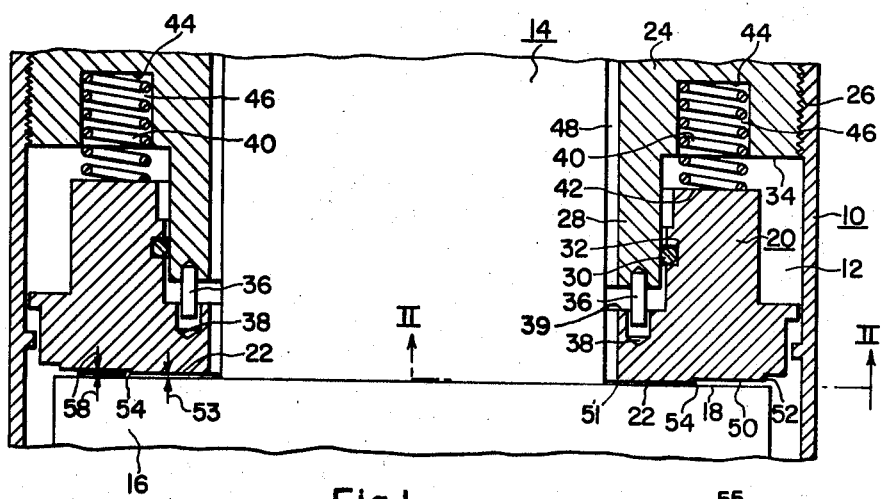
FIG. 1 shows a sectional view of a seal arrangement constructed in accordance with the principles of this invention.
Figure 2:
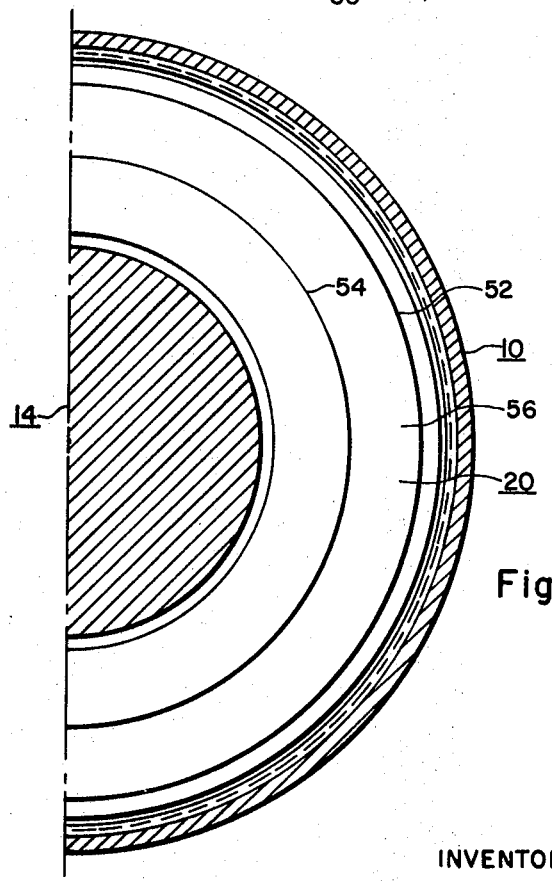
FIG. 2 is a sectional view of the seal arrangement of FIG. 1 taken along lines II—II thereof.

In accordance with the invention and referring now to FIGS. 1 and 2, there is provided a housing 10 which is adapted to form a pressure chamber therein, indicated by the reference character 12. A movable body such as a shaft 14 is mounted within the housing 10 and is provided with a laterally extending runner 16 thereon having an upwardly facing lateral surface 18 of annular configuration. A seal ring 20 desirably is positioned within the pressure chamber 12 intermediate the housing 10 and shaft 14 and is provided with a lower surface 22 confronting the surface 18 of the runner 16. A cap or retaining member 24 desirably is formed of annular configuration and is secured to the upper end of the housing 10 by threads at 26. The cap 24 receives the portion of the shaft 14 at the central opening thereof and includes a downwardly extending portion 28 disposed intermediate the shaft 14 and a portion of the seal ring 20. The cap 26, portion 28 and housing 10 form the extremities of the pressure chamber 12. In order to prevent leakage from the pressure chamber 12 along the path intermediate the downwardly extending portion 28 and the seal ring 20, suitable sealing means such as an O-ring 30 is disposed in an annular groove 32 formed in the seal ring 20 and juxtaposed to the downwardly extending cap portion 28. The O-ring 30 desirably is mounted in compression between the cap portion 28 and the seal ring 20 to prevent fluid leakage therepast, yet the O-ring 30 desirably is formed from resilient material to permit relative axial movement between the seal ring 20 and the cap portion 28. The seal ring 20 desirably is mounted for limited axial movement relative to the shaft 14 and runner 16. In furtherance of this purpose the seal ring 20 is movable intermediate the surface 18 and a lower surface 34 of the cap 26. Since the shaft 14 is mounted for rotation in the housing 10 it is desirable to prevent the seal member 20 from rotating. In furtherance of this purpose a plurality of antirotational pins 36 are formed in the cap portion 28 and are disposed to fit loosely into recesses 38 formed in the upper surface 19 of seal ring 20 which is exposed to the low pressure region adjacent shaft 14. Means are provided for biasing the surface 22 of the seal ring 20 into engagement with the runner surface 18. One example of such means comprises symmetrically space springs 40 which are disposed in compression between the upper surface 42 of the seal rings 20 and an inward surface 44 formed in a recess 46 within the cap 24.

In accordance with the operation of the invention, it is desired to provide a pressure barrier between the pressure chamber 12 and the annular region 48 adjacent the shaft 14. The seal ring 20 is utilized as the pressure barrier means, but in accordance with the operation of this invention permits a controlled amount of leakage flow to the region 48 from the pressure chamber 12 along a fluid film producing region denoted by the reference character 50 and formed between the confronting surfaces 18 and 22 of the runner and seal ring, respectively. The film producing region 50 extends between the extremities 52 and 51 of the seal ring 20.

In order to obtain a self-restoring feature for the seal ring 20, it is necessary to have a non-uniform pressure gradient in the film producing region 50 formed in such a manner that relative displacement of one of the co-acting members will so change the pressure gradients that a restoring force due to fluid pressure will be created. This is accomplished by providing a shoulder 54 so that the operating equilibrium thickness of the outer portion of the film producing region between the outer extremity 52 thereof and shoulder 54 is greater by the thickness of offset indicated at 58 than the operating equilibrium thickness 53 of the inner portion of the film producing region between shoulder 54 and the low pressure extremity of said portion of film producing region 50. Generally the thickness of the outer portion of the film producing region 50 at equilibrium would be of the order of 2 to 3 times the thickness of the inner portion indicated at 53. If, for example, at equilibrium, the film thickness of the outer portion of film producing region 50 is twice the film thickness 53 of the inner portion, then the pressure gradient in the thicker film will be approximately ⅛ of the pressure gradient in the thinner film; a displacement which reduces the thinner film by 50% would reduce the thicker film by 25% so that the ratio of the film thicknesses would become 1 to 3 and the pressure gradient in the thicker film would be approximately ¹⁄₂₇ of the pressure gradient in the thinner film. This would create a substantial increase in the total fluid pressure force on seal ring 20 within the film producing region which acts to restore seal ring 20 to its position of equilibrium.

The diameter of the concentric circle 54, defining the inward limit of the thicker film producing region is selected in relation to the diameters of the extremities 51 and 52 of the film producing region so that when the film thickness 53 is at the desired value, the force exerted by the fluid on the surfaces of ring 20 in the film producing region 50 is equal to the forces exerted by the fluid on the oppositely disposed surfaces of said ring.

Considering now a specific example of the invention, when the pressure difference between the high pressure region 12 and the annular region 48 is on the order of 2,000 pounds per square inch, the shaft 14 has a diameter of 5½ inches and the width of the film producing region 50, that is the distance between the inner and outer extremities 51 and 52 of the seal ring 20 is 1½ inches. The thickness of the film producing region indicated by the reference character 53 is, for example, 0.0003 inch when the seal ring 20 is at equilibrium and the thickness 58 of the offset formed by the shoulder 54 is, for example, 0.0003 inch.

In the event that the thickness 53 of the film producing region 50 is displaced from its equilibrium position by 0.0001 inch in either direction, a restoring force in excess of 1500 pounds is created on the seal ring. The magnitude of this restoring force is placed in perspective when it is realized that the seal ring 20 for this example would weigh on the order of 20 pounds.

Figure 1A:
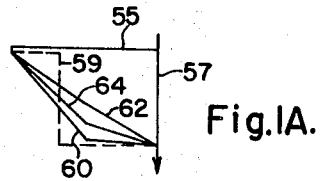
FIG. 1A is a force or pressure diagram of the seal arrangement of FIG. 1.

Referring now to the force diagram of FIG. 1A, it will be appreciated that the area enclosed by the lines 55, 57 and 59 depict the fluid forces or pressures always exerted downwardly on the seal ring 20 when disposed in the position of FIG. 1, which act to close the gap 53. The area enclosed by the lines 55, 57 and 60 depicts the lifting force or pressure exerted on the film producing region 50 of the seal ring 20 when the confronting surfaces 22 and 18 are in engagement (i.e. when the distance depicted by the lines 53 equals zero).

In the latter position of the seal ring 20, the magnitude of the upward forces as depicted by the area enclosed by the lines 55, 57 and 60 exceeds the downward force as depicted by the lines 55, 57 and 59 resulting in an upward movement of the ring 20 to increase the thickness 53 of the film producing region to equilibrium size.

The area enclosed by the lines 55, 57 and 62 depicts the upward forces or pressures exerted on the seal ring 20 when the thickness 53 of the film producing region 50 exceeds the equilibrium thickness. The magnitude of the forces depicted by the area formed by lines 55, 57 and 62 is smaller than and opposite in direction to the constant downward force as enclosed by lines 55, 57 and 59, so that there is exerted upon the seal ring 20 a net downward force moving the seal ring downwardly and reducing the thickness of the gap 53, to its equilibrium position.

When the thickness of the gap 53 is at equilibrium, the upward force on the seal ring 20 corresponds in magnitude to the area enclosed by lines 55, 57 and 64 of FIG. 1A. The latter area is equal and opposite to the constant downward force on the seal ring 20 as defined by lines 55, 57 and 59. Thus, the seal ring 20 will remain at the equilibrium position.

It will therefore be appreciated that for any given pressure difference across the seal ring 20, only one equilibrium film thickness is produced and that any variation of the position of the seal ring from the equilibrium film thickness results in the creation of a substantial force tending to return the seal ring to the equilibrium position.

It has been determined that the provision of the offset portion between the shoulder 54 and outer or high pressure extremity 52 of the film producing region serves as a convenient and efficient means for obtaining a desired equilibrium pressure distribution across the gap. In the construction of the seal ring 20 and the runner 16, it is desirable that the confronting surfaces 22 and 18 be as flat as possible.

The springs 46 are utilized in the seal construction solely for the purpose of closing the gap 53 when there is a very small pressure drop across the ring 20. The springs 46 are weak springs when compared with the system fluid forces and thereby do not add in any substantial manner to the fluid forces acting on the seal ring 20.

Figure 3:
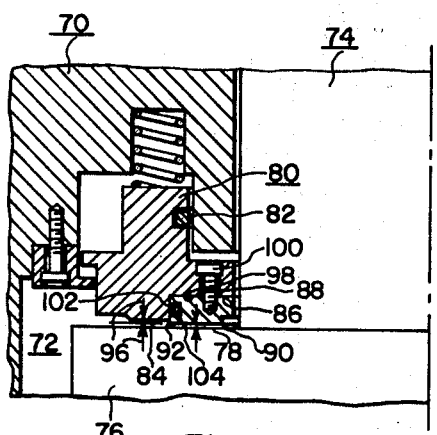
FIG. 3 is a sectional view of a seal ring arrangement illustrating a modification.

The offset or thickness 58 formed by the shoulder 54 for most applications desirably is on the order of from 0.0001 to 0.001 inch and advantageously from 0.0001 to 0.0003 inch to provide for the desired pressure gradients. The construction of a seal ring having such a small offset presents a relatively difficult machining or grinding problem. In order to reduce the criticallity of the machining operation, the arrangement of FIG. 3 may be utilized to provide the necessary shoulder 54 of FIG. 1. In the FIG. 3 embodiment, there is provided a housing 70 forming a pressure chamber 72 therein. The housing 70 receives a shaft 74 having an offset portion or runner 76 formed thereon and providing a radially extending surface 78. The seal ring 80 is disposed over the housing and is provided with an O-ring 82 which cooperates with the housing 70 in the same manner as the O-ring 32. The lower or sealing face 84 of the seal ring 80 is provided with a recess 86 adjacent the low pressure extremity of the seal ring 82. The depth of the recess 86 is critically measured and the lower surface 88 thereof is formed to be parallel to the surface 84. An annular ring or insert 90 is formed of a thickness greater than the depth of the recess by an amount equal to the desired height of the shoulder 54. The insert 90 is disposed in the recess 86 to form a shoulder 92 of desired thickness so that the lower surface 94 of the insert protrudes into the film producing region by the desired amount (for example, the distance between the arrows 96 desirably is from 0.0001 to 0.001 inch for the arrangement shown). Means are provided for fixedly positioning the insert 90 relative to the seal ring 80. In furtherance of this purpose a plurality of openings 98 are formed in the seal ring 80 and received bolts 100 which are threadedly secured to the insert 90 for positioning the latter into engagement with the inward surface 88 of the recess 86. To prevent a leakage flow path between the insert 90 and the surfaces forming the recess 86, a sealing means such as O-ring 102 is disposed in an annular slot 104 formed in the insert 90.

Inasmuch as it is less difficult to machine a protruding insert 90 than it is to form the relatively small shoulder 54 of the FIG. 1 embodiment, the construction of the seal ring 80 serving the same function as the seal ring 20 of FIG. 1 may be more easily accomplished.

It will be realized that the specific sizes and dimensions of the seal ring 20, of the shaft 14 and the specific pressures referred to herein are merely illustrative of specific constructions of this invention and are not limiting. Other sizes of shafts, seal rings for use in systems having different pressure distributions fall within the scope of this invention.

It will be appreciated then by those skilled in the art that the embodiments of this invention described with particularity herein may be varied in certain respects without departing from the broad spirit and scope of this invention. Accordingly, it is specifically intended that the embodiments of this invention as described above be interpreted as illustrative of the invention, rather than limiting.

What is claimed is:

1. In a seal assembly, a rotatable shaft having a radially extending annular substantially flat surface formed thereon, a seal ring mounted about said shaft and having a pair of generally opposed radial surfaces formed thereon, said ring being axially movable relative to said shaft, one of said seal ring radial surfaces confronting said shaft radial surface, a hollow housing defining a fluid pressure chamber therein receiving said shaft and said seal ring therein, said other seal ring radial surface and the outer edge of said one seal ring radial surface being exposed to said pressure chamber, the inner edge of said one seal ring radial surface being exposed to a region of relatively low pressure disposed adjacent said shaft, so that fluid flows from said pressure chamber to said low pressure region along a path between said confronting surfaces, said one seal ring surface having an annular portion thereof adjacent said ring outer edge spaced farther from said radial shaft surface than the remainder of said one seal ring surface to vary the radial pressure drop along said path, and the remainder of said one seal ring surface being substantially flat and always substantially parallel to the flat surface of the shaft.

2. In a seal assembly, a rotatable shaft having a radially extending annular substantially flat surface formed thereon, a seal ring mounted about said shaft and having a pair of generally opposed radial surfaces formed thereon, said ring being axially movable relative to said shaft, one of said seal ring radial surfaces confronting said shaft radial surface, to form a film producing region therebetween, a hollow housing defining a fluid pressure chamber therein receiving said shaft and said seal ring therein, said other seal ring radial surface and the outer edge of said one seal ring radial surface being exposed to said pressure chamber, the inner edge of said one seal ring radial surface being exposed to a region of relatively low pressure disposed adjacent said shaft, so that fluid flows from said pressure chamber to said low pressure region along a path between said confronting surfaces, said one seal ring surface having an annular portion thereof adjacent said ring outer edge spaced farther from said radial shaft surface than the remainder of said one seal ring surface to vary the radial pressure drop along said path, said remainder of said one seal ring surface being substantially flat and parallel to the flat surface of said shaft, whereby the sealing ring is maintained in a predetermined position and any change in the pressure gradients in the film producing region results in restoring the sealing ring to said predetermined position.

3. In a seal assembly, a rotatable shaft having a radially extending annular substantially flat surface formed thereon, a seal ring mounted about said shaft and having a pair of generally opposed radial surfaces formed thereon, said ring being axially movable relative to said shaft, one of said seal ring radial surfaces confronting said shaft radial surface to form a film producing region therebetween, a hollow housing defining a fluid pressure chamber therein receiving said shaft and said seal ring therein, a predetermined portion of the other of said seal ring radial rurfaces and the outer edges of said one seal ring radial surface being subjected to the full pressure of said pressure chamber, the inner edge of said one seal ring radial surface being exposed to a region of relatively low pressure disposed adjacent said shaft, so that fluid flows from said pressure chamber to said low pressure region along a path between said confronting surfaces, said one seal ring surface having an annular portion thereof adjacent said ring outer edge spaced farther from said radial shaft surface than the remainder of said one seal ring surface to effect a change in the pressure gradient along said path, said remainder of said one seal ring surface being substantially flat and parallel to the flat surface of said shaft, whereby the seal ring is normally in a predetermined position and any change in said predetermined position results in a relative change in the pressure gradients in the film producing region causing a change in the forces on said one seal ring radial surface to restore the seal ring to said predetermined position.

References Cited

UNITED STATES PATENTS

| 2,910,313 | 10/1959 | La Bour | 277—67 X |
| 3,101,200 | 8/1963 | Tracy | 277—81 X |
| 2,221,225 | 11/1940 | Weis et al. | 103—112 |
| 2,814,512 | 11/1957 | Quinn et al. | 277—3 |
| 2,907,594 | 10/1959 | Macks | 277—23 |
| 2,984,507 | 5/1961 | Welch | 277—27 |

SAMUEL ROTHBERG, Primary Examiner

U.S. Cl. X.R.

277—91